United States Patent [19]

Check et al.

[11] 4,239,088
[45] Dec. 16, 1980

[54] SCALE WITH WEIGHT-TO-PERIOD TRANSDUCER

[75] Inventors: Frank T. Check, Orange; Keith E. Schubert, West Norwalk, both of Conn.

[73] Assignee: Pitney Bowes Inc., Stamford, Conn.

[21] Appl. No.: 1,622

[22] Filed: Jan. 8, 1979

[51] Int. Cl.³ .............................................. G01G 3/13
[52] U.S. Cl. ............................ 177/210 FP; 310/338; 331/65
[58] Field of Search ......... 177/210 FP, 210 C, 210 R; 73/DIG. 4; 331/163, 65, 116 R; 310/316, 323, 338, 339

[56] References Cited

U.S. PATENT DOCUMENTS

| | | | |
|---|---|---|---|
| 3,332,506 | 7/1967 | Bradfield | 177/210 C |
| 3,541,849 | 11/1970 | Corbett | 73/517 AV X |
| 3,991,840 | 11/1976 | Rawcliffe | 177/210 FP |
| 4,041,289 | 8/1977 | Brosh | 177/1 X |

FOREIGN PATENT DOCUMENTS 437918  2/1975  U.S.S.R. ............................. 177/210 R

Primary Examiner—Joseph W. Hartary
Attorney, Agent, or Firm—Mark Levy; William D. Soltow, Jr.; Albert W. Scribner

[57] ABSTRACT

A postage scale includes a directly loaded weight-to-period transducer which provides an oscillating output, the period of which varies as a function of the weight to be measured. The transducer includes a disc of piezo-electrically active material bonded to an inactive substrate base which dishes at its center in response to the weight to be measured. The transducer frequency output is processed to provide a digital period signal. A reference oscillator having matched temperature characteristics generates a high frequency count calibrated for scaling the transducer period to a weight count. The high frequency signal and the period signal are gated to provide an input to a counter which generates a digital weight information signal. The weight information signal is transmitted to a mailing system processor for use in determining the postage requisite for mailing the article.

9 Claims, 6 Drawing Figures

OSC. SIG.

PULSE SIG.

PERIOD SIG.

H.F. SIG.

W.T. SIG.

SCALE WITH WEIGHT-TO-PERIOD TRANSDUCER

BACKGROUND OF THE INVENTION

1. Field of the Invention

This invention relates generally to postage mailing systems and more particularly to scales having piezoelectric transducers for generating weight information signals.

2. Brief Description of the Prior Art

Several problems have been encountered in the design of automated mail processing equipment wherein mail pieces to be posted were sorted, sealed, weighed and the appropriate postage affixed. Equipment designs incorporated various stations for mail processing with individual mail pieces being transported along a flow path between stations.

Prior weighing devices incorporated a deflectable weighing pan upon which the article was placed. Traditionally, the pan was spring biased and deflected under the weight of the article. Such deflection was measured and appropriate signal which was derived from the spring constant and the measured deflection was generated.

The deflection of scale pans has heretofore been detected by various optical systems as that disclosed in U.S. Pat. No. 4,044,847 issued to Wu on Aug. 30, 1977 and assigned to the assignee of the present invention, and U.S. Pat. No. 3,861,480 assigned to the assignee of the present invention. Unfortunately, the implementation of spring biased scales in an automated mailing system required significant dwell or weighing cycle time in order to permit the pan to deflect and the concommitant oscillations to dampen. Further, the use of damping mechanisms to retard oscillation merely increased the scale response time.

Because of the scale pan deflection, each mail piece had to be removed from the weighing station at a lower transport elevation than the entrance elevation. Such transport attitude changes detracted from high speed operation and efficient flow path designs.

Additional problems had been encountered with respect to prior transducers employed to detect scale deflection and provide appropriate weight indicative signals. Optical systems were expensive and their installation was time consuming and costly due to optical resolution requirements.

Prior approaches at providing weight indicative signals through the use of strain guages to measure the deflection of a spring biased scale required additional signal processing, initially amplifying the traditionally low output and then converting an amplified analog transducer signal into an appropriate digital signal for utilization in digital processing for computation of postage. It should be appreciated that the employment of amplifiers and analog-to-digital converters for signal processing introduced additional error sources in the mailing system.

SUMMARY OF THE INVENTION

A postage scale in an automated mailing system includes an unbiased tare mechanism having a flexible leaf parallelogram linkage which applies the mailing piece weight directly upon the center of a disc configuration piezoelectric transducer. A weight information signal is generated by measuring the transducer signal period as scaled against a high frequency reference oscillator subjected to temperature variations matching the transducer. The reference oscillator signal is gated with the transducer period and counted during a time frame established by the duration of the instantaneous transducer period to provide a counted weight information signal.

The weight information signal is received at a mailing system processor and utilized for the computation of postage requisite for mailing the article.

From the foregoing compendium, it will be appreciated that it is an object of the present invention to provide a scale with a weight-to-period transducer of the general character described which is not subject to the disadvantages aforementioned.

It is a further object of the present invention to provide a scale with a weight-to-period transducer of the general character described wherein the article weight is directly applied to the transducer.

Another object of the present invention is to provide a scale with a weight-to-period transducer of the general character described which provides a digital weight information signal with but a modicum of scale deflection.

Yet another object of the present invention is to provide a scale with a weight-to-period transducer of the general character described which facilitates rapid weigh cycle times for mail transported through an automated mailing system and optimizes transport path design capabilities.

Still another object of the present invention is to provide a scale with a weight-to-period transducer of the general character described wherein article weight information is generated as a digital based signal.

A further object of the present invention is to provide a scale with a weight-to-period transducer of the general character described wherein a signal indicative of the frequency of oscillation is indirectly determined with reference to the duration of oscillation period.

Other objects of the invention in part will be obvious and in part will be pointed out hereinafter.

With these ends in view, the invention finds embodiment in certain combinations of elements and arrangements of parts and series of steps by which said objects and certain other objects are hereinafter attained, all as fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figure 1:
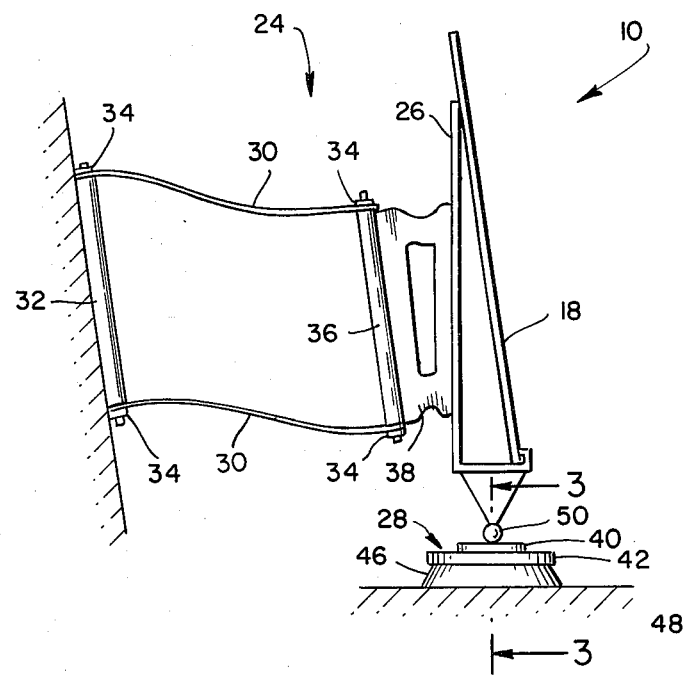
FIG. 1 is a side elevational view of a postage scale forming a typical weighing station in automated mail processing equipment and including a disc type piezoelectric transducer for the generation of weight information signals in accordance with the present invention.
Figure 2:
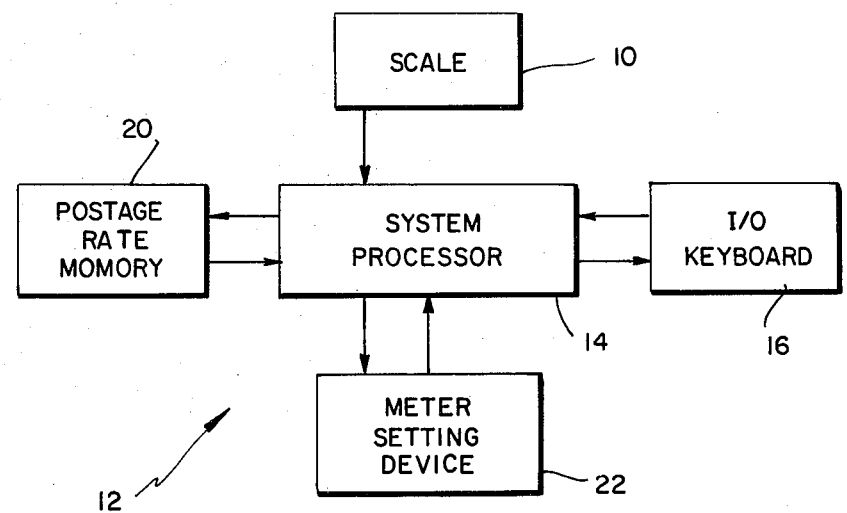
FIG. 2 is a block diagram illustrating major components for the computation and dispensing of postage in automated mail processing equipment.

Referring now in detail to the drawings, the reference numeral 10 denotes generally a postage scale constructed in accordance with and embodying the invention which may comprise a weighing station in an automated mail processing system 12 adapted to weigh multiple mail pieces, compute the requisite postage for each piece and apply such postage to the piece. The automated system 12 may typically include a system processor 14 which receives weight indicative signals from the scale 10 for use in the calculation of requisite postage.

An additional input/output device associated with the system 12 is a keyboard 16 wherein an operator may provide information requisite for determining appropriate postage such as class of transportation, destination information and article size information. The processor 14 is adapted to determine the appropriate postage for the mailing of each piece 18 by accessing various postage rate data stored in a memory 20, in a manner similar to that illustrated in U.S. Pat. No. 3,692,988 issued to Dlugos et al on Sept. 9, 1972 and assigned to the assignee of the present invention.

After determining the requisite postage, the processor 14 transmits appropriate signals to a meter setting device 22 for imprinting postage on the mail piece 18.

The scale 10 may include a tare mechanism 24 having an appropriate linkage for maintaining a weighing pan 26 in a vertical position to assure that the weight of the mail piece 18 is transmitted vertically to a transducer 28. The tare mechanism includes a pair of flexible horizontal leaves 30, each anchored along one edge to an isolated frame 32 by an appropriate clamping plate 34. Similarly, the opposite edge of each leaf 30 is anchored to a movable pan support 36 through additional clamping plates 34. An intermediate bracket 38 serves to secure the pan 26 to the pan support 36. The leaves 30 permit limited displacement of the pan 26 in a vertical direction by providing a parallelogram-type linkage.

Figure 3:
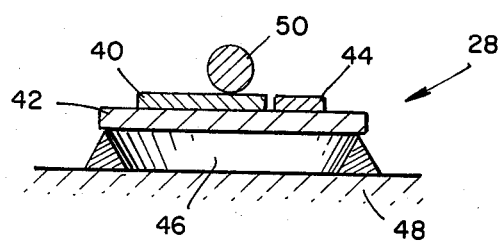
FIG. 3 is an enlarged sectional view through the transducer, the same being taken substantially along the line 3—3 of FIG. 1, but showing the transducer at an unloaded position wherein it is supporting only the weight of the scale tare mechanism.

In accordance with the invention, the transducer 28 is positioned beneath the pan 26 and is adapted to support the pan 26 and the mail piece 18 carried thereby. The transducer 28 includes a circular disc 40 of piezoelectrically active material bonded to an inactive substrate 42 comprising a larger disc. As shown in FIG. 3, the piezoelectrically active disc 40 may be segmented and a smaller chordal segment 44 is provided to complete a circular plan configuration. Piezoelectrical transducers of this type have been employed heretofore for the purpose of producing audio tones and are available from Vernitron, Piezoelectric Division, Bedford, Ohio, and sold under the mark PZT Unimorphs. With reference to FIG. 1, it will be seen that the transducer 28 is preferably supported by an annular base ring 46 which rests upon an isolated supporting surface 48.

Figure 4:
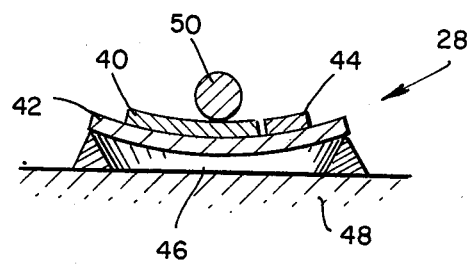
FIG. 4 is a sectional view similar to that of FIG. 3, yet showing the transducer in an exaggerated state of deformation under the load carried by the scale tare mechanism.

The weight applied to the pan 26 is transmitted to the center of the transducer 28 through a spherical contactor 50 which depends from the center of the pan at the expected center of gravity of the mail piece 18 and is maintained in fixed position relative to the pan 26. The transducer 28 is substantially horizontal prior to the placement of a mail piece 18 upon the scale pan 26. When the mail piece 18 is placed upon the pan 26, the added weight supported by the transducer 28 as applied at the center of the transducer through the spherical element 50 causes the transducer to dish downwardly with the extent of deflection being exaggerated in the illustration of FIG. 4.

The present invention utilizes the principle that a piezoelectric crystal such as the transducer 28 exhibits a natural frequency of oscillation, which frequency changes as a result of the load applied through the spherical contactor 50. Thus, the frequency of the transducer 28 varies as a function of the weight of the mail piece 18. In lieu of measuring frequency directly to determine the weight of the mail piece 18, the present invention provides for the indirect determination of frequency by measuring the period of oscillation. Incorporation of period measurement in lieu of frequency measurement provides a quicker measurement cycle and permits the utilization of a time base oscillator for scaling the count obtained into appropriate value units.

Figure 6:
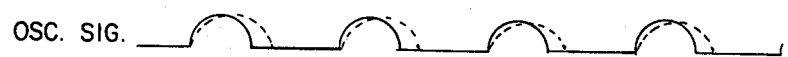
FIG. 6 is a graphic representation of various signals of the circuit of FIG. 5.
Figure 6:
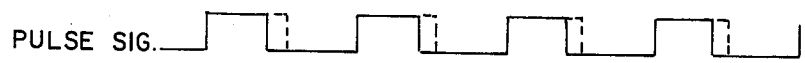
Figure 6:
Figure 6:
Figure 6:
Figure 5:
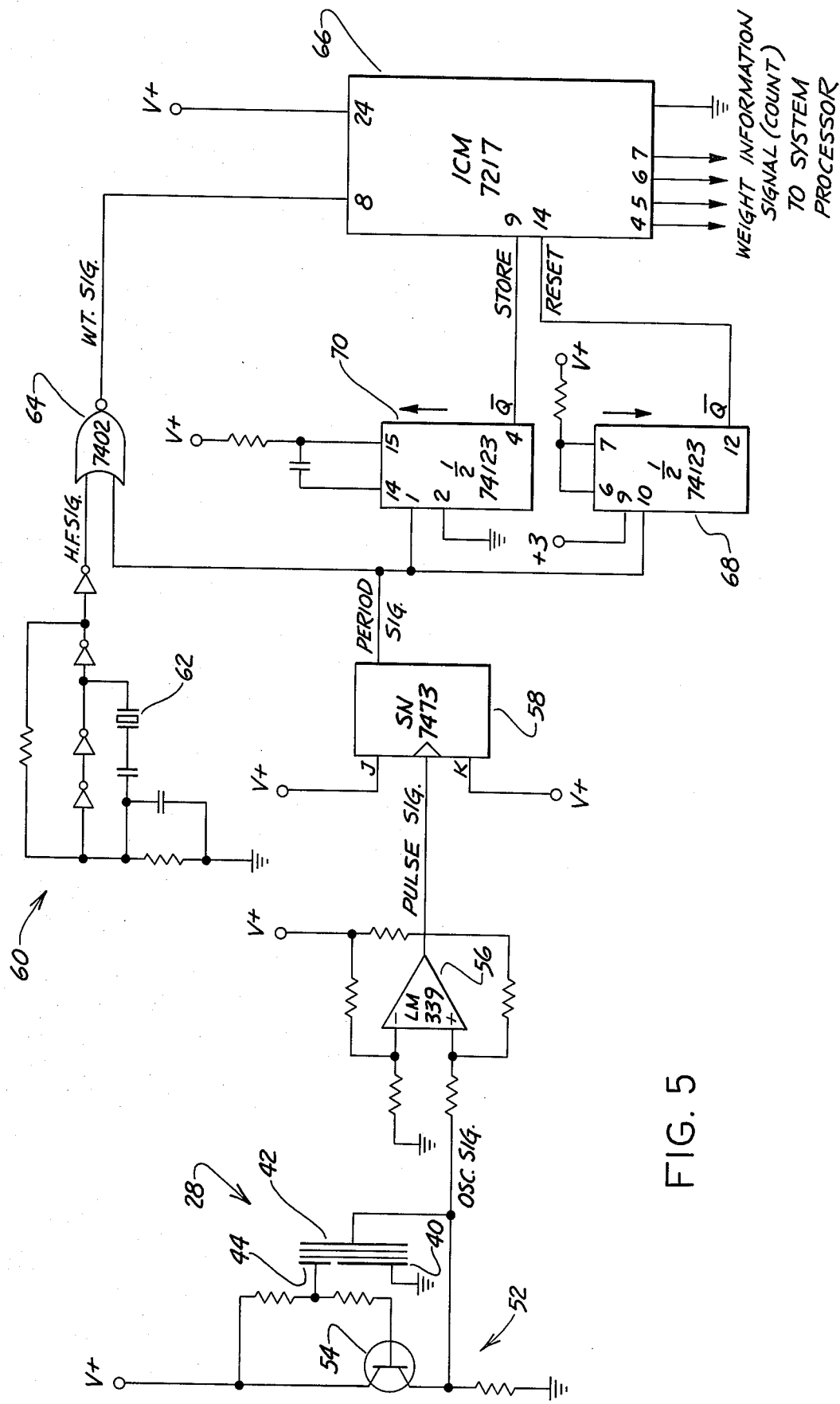
FIG. 5 is a schematized block diagram illustrating a typical circuit for activation of the transducer and control logic for measuring the transducer period to provide a weight information signal for the computation of postage.

With reference now to FIG. 5 wherein a typical circuit is shown, an oscillator circuit 52 employs a transistor 54, the base of which is biased through a feedback section comprising the chordal disc 44 of the transducer 28 to generate a signal designated OSC. SIG. (OSCILLATOR SIGNAL) which, as heretofore mentioned, varies in frequency as a function of the load applied through the spherical contactor 50. A typical OSC. SIG. is shown in FIG. 6. The OSC. SIG. is shaped at a comparator 56 which generates a corresponding square signal designated PULSE SIG.

It should be appreciated that the OSC. SIG. may not be sinusoidal and may vary, for example, as shown in the dashed and solid lines in FIG. 6. The PULSE SIG. will similarly vary in pulse duration from unit to unit. In order to avoid such variations, only full cycles of the OSC. SIG. are utilized as a basis for weight measurement. Accordingly, the signal PULSE SIG. is employed as a clock input to a JK flip flop 58 to divide the PULSE SIG. in half and generate a PERIOD SIG. which is dependent only upon the instantaneous frequency of the oscillator circuit 52. As shown in FIG. 6, the PERIOD SIG. varies from high to low levels upon each full cycle of the OSC. SIG.

A high frequency oscillator circuit 60 employing a piezoelectric crystal 62 generates a high frequency time base signal designated H. F. SIG., the frequency of which is preselected to be compatible with the pulses of the PERIOD SIG. to scale the duration of the PERIOD SIG. to a numerical count value having weight information significance. The piezoelectric crystal 62 of the high frequency oscillator circuit 60 is preferably subject to the same temperature conditions as the transducer 28 and is responsive to temperature changes in a like manner to thereby provide the system with automatic temperature corrective capabilities.

The H. F. SIG. output of the high frequency oscillator circuit 60 is received at a NOR gate 64 along with the PERIOD SIG. such that when the PERIOD SIG. is low, the output of the gate 64 will comprise inverted pulses of the H. F. SIG. This gate output, designated WT. SIG., is framed by the duration of the low signal value portions of the PERIOD SIG. Thus, if the period of the OSC. SIG. lengthens, more pulses will be generated at the gate 64 while if the period of the OSC. SIG. is shorter, less pulses will be provided.

In order to provide a weight information signal for the processor 14, the WT. SIG. is transmitted to a counter 66 which may comprise an Intersil ICM 7217 four digit presettable up/down counter. The counter 66 receives a RESET signal to indicate the initiation of a new counting cycle by a pulse provided as an output of a monostable multivibrator 68 which is triggered by a negative going edge of the PERIOD SIG. The value counted at the counter 66 is stored by a pulse signal along a STORE input which is provided as an output from a further monostable multivibrator 70 which in turn is triggered by a positive going edge of the PERIOD SIG. The multivibrators 68, 70 may comprise segments of a dual multivibrator chip such as a 74123 chip.

Upon receiving a pulse along the STORE line, the counter 66 loads the count into output registers as a weight information signal which may be parallel loaded into the system processor 14.

The weight information signal may comprise direct weight indicative values. If the frequency output of the transducer 28, hence the period of the OSC. SIG., does not vary as a direct function of the weight of the applied load, appropriate conversion values between the weight information signal and the article weight may be stored in a read only memory. Thus the weight information signal may be used to address the read only memory and obtain the appropriate weight values.

It should also be appreciated that a suitable display of the weight value may be provided either as an output of the counter 66 or as a further output of the system processor 14. Additionally, the processor 14 may be programmed for further processing to effect an automatic zero because the frequency of the OSC. SIG. is not zero when there is no load applied to the scale pan 26. Compensation for this phenomenon may be achieved by detecting differences in period or frequency, i.e. counting down from zero when the pan 26 is not loaded and then counting up from this value when the pan is loaded. Alternatively, the counter 66 includes an appropriate presettable register and countdown or countup logic for determining difference values in lieu of presenting raw count data to the system processor 14 for absolute value weight determination.

It should also be appreciated that in high speed bulk mailing operations, absolute weight values need not be individually determined and the weighing scale 10 is provided merely for detection of an overweight condition. Under such circumstances, the processor 14 merely determines whether the weight information signal (count) exceeds a preset limit value.

Thus, it will be seen that there is provided a scale with a weight-to-period transducer which achieves the various objects of the invention and which is well suited to meet the conditions of practical use.

As various changes might be made in the scale with weight-to-period transducer as above set forth, it is to be understood that all matter herein described or shown in the accompanying drawings is to be interpreted as illustrative and not in a limiting sense.

Having thus described the invention, there is claimed as new and desired to be secured by Letters Patent:

1. A scale comprising a frame, load carrying means for carrying an article to be weighed, transducer means, means fixedly supporting the transducer means with respect to the frame, force transmitting means interconnecting the load carrying means and the transducer means, means actuating the transducer means to provide an oscillatory signal, the period of oscillation of which varies as a function of the weight of the load and means receiving the oscillatory signal and generating a period signal indicative of full cycles of oscillation of the oscillatory signal and in response thereto measuring the duration of its period of oscillation to provide an article weight signal.

2. A scale constructed in accordance with claim 1 further including a high frequency oscillator, the high frequency oscillator generating a timing signal, the timing signal providing a reference time base for measuring the period of oscillation of the oscillatory signal.

3. A scale constructed in accordance with claim 2 further including gate means, the gate means receiving the period signal and the timing signal and in response thereto generating a high frequency signal framed by a period of the oscillatory signal.

4. A scale constructed in accordance with claim 1 wherein the transducer comprises a piezoelectrically active material.

5. A scale constructed in accordance with claim 4 wherein the piezoelectrically active material is formed in disc configuration, the force transmitting means transmitting the article weight to the center of the disc configuration.

6. A scale constructed in accordance with claim 5 wherein the transducer includes an under surface and an upper surface, the supporting means including means engaging the transducer on the under surface adjacent the periphery thereof and the force transmitting means including means engaging the transducer on the upper surface.

7. A scale constructed in accordance with claim 6 wherein the supporting means comprises annular means in continuous contact with the under surface of the transducer means.

8. A postal scale suitable for automated mail processing applications, the scale comprising a pan adapted to carry an article being weighed, a disc shaped piezoelectric transducer, means supporting the transducer adjacent the periphery thereof, means for applying the weight of the article to an unsupported area of the transducer, means electrically driving the transducer, the transducer providing an oscillatory signal in response to the driving means, means receiving the oscillatory signal and providing a square waveform signal in response thereto, means receiving the square waveform signal and in response thereto providing a period signal indicative of the period of oscillation of the oscillatory signal and means receiving the period signal and in response thereto providing an article weight signal.

9. A postal scale constructed in accordance with claim 8, further including a time base means for generating a time reference signal, gate means, the gate means receiving the reference signal and the period signal and in response thereto providing the weight signal, the weight signal comprising a plurality of pulses framed by the period of the oscillatory signal.

* * * * *